(12) United States Patent
Safranek

(10) Patent No.: US 8,800,622 B2
(45) Date of Patent: Aug. 12, 2014

(54) SYSTEM AND METHOD OF USING A FRICTION INCREASE DEVICE

(76) Inventor: Jerry F. Safranek, Solon, OH (US)

( * ) Notice: Subject to any disclaimer, the term of this patent is extended or adjusted under 35 U.S.C. 154(b) by 409 days.

(21) Appl. No.: 13/134,704

(22) Filed: Jun. 15, 2011

(65) Prior Publication Data

US 2011/0303334 A1    Dec. 15, 2011

Related U.S. Application Data

(60) Provisional application No. 61/397,648, filed on Jun. 15, 2010.

(51) Int. Cl.
*B60C 27/00* (2006.01)
*B60C 27/02* (2006.01)
*B60C 27/04* (2006.01)

(52) U.S. Cl.
CPC .............. *B60C 27/04* (2013.01); *Y10S 977/902* (2013.01)
USPC ......................................... 152/216; 977/902

(58) Field of Classification Search
USPC .................. 152/218, 216, 217, 223, 214, 221
See application file for complete search history.

(56) References Cited

U.S. PATENT DOCUMENTS

| 2,826,232 | A | * | 3/1958 | Korn | 152/217 |
| 4,187,894 | A | * | 2/1980 | Peterson | 152/222 |
| 5,513,684 | A | * | 5/1996 | Laub | 152/216 |
| 7,036,542 | B2 | * | 5/2006 | Kaiser et al. | 152/218 |
| 7,055,567 | B1 | * | 6/2006 | Della Camera | 152/218 |
| 7,198,084 | B2 | * | 4/2007 | Riemer et al. | 152/221 |

* cited by examiner

*Primary Examiner* — Glenn Dayoan
*Assistant Examiner* — Sunsurraye Westbrook
(74) *Attorney, Agent, or Firm* — George W. Moxon, II; Brian P. Harrod

(57) ABSTRACT

A tire friction device utilizes a sub-frame assembly with a length adjustment assembly to grip a tire. Grip members are used to grip a tire. The grip members attach to the tire tread and/or tire side walls utilizing friction components. The grip members have friction components on their outer surface to provide additional friction for vehicle (e.g., car or truck) tires on surfaces such as snow, ice, loose gravel and mud that is easy to apply and remove from a tire.

14 Claims, 7 Drawing Sheets

SYSTEM AND METHOD OF USING A FRICTION INCREASE DEVICE

RELATED APPLICATION

This application claims priority to U.S. Provisional Application Ser. No. 61/397,648, filed Jun. 15, 2010, entitled "SYSTEM AND METHOD OF USING A FRICTION INCREASING DEVICE".

FIELD OF THE INVENTION

The invention relates generally to an adjustable friction increasing device capable of providing additional traction for vehicle (e.g., car or truck) tires on surfaces such as snow, ice, loose gravel and mud, that is easy to apply and remove from a tire and store in a location such as a trunk, and a method of using such a device to enhance traction for a vehicle stuck in these conditions.

BACKGROUND OF THE INVENTION

The present invention relates to an adjustable friction increasing device and method for quickly and easily adding traction to a vehicle tire to assist a vehicle in moving off soft, low traction, or slippery surfaces such as snow, ice, mud, and the like.

Regular vehicle tires are designed for hard non-slip surfaces such as concrete, asphalt or packed down gravel which are encountered during normal driving conditions. These tires usually perform adequately under normal, wet or snow and icy road conditions. However, tires become limited when confronted with surfaces for which they are not designed, such as heavy snow, certain ice conditions, mud, ruts, sand, loose gravel and obstructions, for example. A common problem occurs in the winter when ice buildup on the surface around the tire prevents the tire from get traction preventing the vehicle from moving. A similar problem may occur in the spring or fall if the vehicle parks on an unpaved surface after a heavy rain and the ground turns to mud. This problem is not limited to the traditional passenger vehicle for use on normal roads. A variety of vehicles such as tractors, ATV's, riding lawn mowers, and the like, may encounter similar problems.

Once stuck, the vehicle is unusable for its intended purpose. This may result in merely a minor inconvenience or a significant financial hardship if the owner can no longer get to work or use the vehicle for its intended purpose. There can also be considerable expense if the vehicle requires towing or is damaged in an attempt to "un-stick" the tires. The owner, helpers, or bystanders may also risk injury in an attempt to push the vehicle or rock it off the slippery surface rotating the tires at high tire RPMs. The problem becomes acute during an emergency situation, for example, when an injured person must be quickly transferred to a hospital using a vehicle that is inoperable due to road conditions.

A variety of temporary tire traction devices have been designed to overcome these problems and are disclosed in prior art. Some prior art devices simply attach to the tire/tire tread itself. A common example of such a prior art device involves attaching tire chains to the tread surface of the tire. Additional examples include replacing the tire with snow or studded tires. Other prior art devices attach directly to the wheel instead. However, all of these prior art devices have limitations such as being difficult to apply and remove especially under less than ideal weather conditions.

Although traditional snow, stud tires, chains, etc. may increase wheel traction, there are a variety of situations where they will not solve the problem, or have many other limitations. Use of these prior art devices requires the vehicle owner to have the foresight to realize that the vehicle will encounter a slippery surface in advance. They are typically seasonally placed on vehicles in geographic areas only where there are heavy winter snows. There is also a significant financial investment in purchasing an entire second set of specialty tires for the vehicle which makes them uneconomical for the majority of vehicle owners. Additionally, they are inconvenient to apply because the entire tire must be removed and replaced making them semi-permanent once mounted. In fact, many, if not most vehicle owners are not able to replace the tires themselves and have to hire a mechanic to install and later remove the tires at even greater expense and effort. An additional problem is that since they are only used in winter, they are not practical for conditions such as mud in the spring or sand at the beach in the summer. An even greater problem is that they cannot be applied once the vehicle is stuck. Finally, they or the road may be damaged if used under normal conditions outside of their intended use. In fact, many municipalities have restrictions as to the time of year residents may use such tires or if they can be used at all because of the damage they do to a road surface.

Devices that mount directly to the tire may also solve some traction issues. However, these prior art devices also suffer many limitations. U.S. Pat. No. 6,708,746 to Wilkinson teaches an emergency traction device that attaches directly to the vehicle tire. The straps in this prior art device provide additional traction. However, this device is not easy to mount or remove. The user must thread a multitude of straps through and around the tire to apply the device. Additionally, this is a disposable device. The straps must all be cut off somehow once the immediate use is over. This creates a risk of injury to the user, a tire puncture and additional expense. Other prior art devices that mount directly to the tire have similar limitations. They may not properly secure to the tire because they flex excessively on movement or they may damage the tire in other ways.

Further types of prior art devices that attach directly to the tire also have limitations. U.S. Pat. No. 3,827,473 to Blickensderfer et al. is an example of a device mountable to a wheel used to provide additional traction that is too basic in design. While it teaches an adjustable device for adding traction, the traction surface only consists of metal bars. This will not provide enough traction to allow a vehicle to move off of many slippery surfaces. This device is also not easy to apply.

Another prior art device that attaches directly to the tire is taught by U.S. Pat. No. 7,055,567 to Della Camera. This is an example of a prior art device mountable to a wheel used to provide additional traction that is overly complicated in design. The plurality of arced traction members makes the device bulky and difficult to quickly and easily install. Additional similar prior art devices likewise suffer from limitations such as sturdiness, cost, etc.

Notwithstanding these prior art devices for providing supplemental traction for a vehicle tire, there continues to be a need for a low cost, easy and safe to operate with one or two hands system and method that attaches to the tire and adjusts easily with little skill, lowers the probability of the user from getting dirty, is usable under a variety of conditions when the need occurs, that has a variety of interchangeable tire friction system elements to provide traction under a variety of different surface conditions, and that can fold up for easy storage.

SUMMARY OF THE INVENTION

Accordingly, the present invention overcomes the limitations of the prior art by providing a unique and useful tire friction device and method capable of providing additional traction for vehicle tires on a variety of slippery surfaces such as snow, ice, sand, mud, loose gravel and the like, that is easy and safe to apply, remove, and store, and a method of using such a tire friction device.

Consequently, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

It is an object of the present invention to provide a new and improved device used to increase the traction of a tire that is stuck in a variety of surfaces such as snow, ice, sand, mud, loose gravel and the like.

It is a further object of this invention to present a device capable of providing temporary tire traction that is simple to use and can fold up or disassemble for easy and compact storage when not in use.

It is an object of the present invention to provide a reusable traction device that attaches easily and safely to a vehicle tire or tire rim with little effort or skill.

It is yet another object of this invention to provide an adjustable traction device that is usable on a variety of tire types, tire rims, sizes, and diameters such as would be found on a car, truck, tractor, ATV, riding lawn mower, and the like.

It is yet a further object of the present invention that the traction device optionally be capable of one-handed attachment, removal, and adjustment.

It is an additional object of the invention to provide a tire friction device made from materials comprising metal, nanotechnology materials, plastic, polymer, or other rigid material that is economical.

It is an additional object of the invention that a tire friction device is usable under extreme weather conditions or otherwise when the need arises so that the device need not be in place before the increased traction is needed.

It is yet another object of this invention to provide a tire friction device with interchangeable gripping surfaces so that the user may select the ideal friction surface necessary to remove the vehicle from a variety of slippery surfaces.

It is yet another embodiment of the present invention to provide a method of using a tire friction device to provide temporary traction to a vehicle tire to remove a vehicle from a slippery surface such as snow, mud, sand, ice, and the like.

BRIEF DESCRIPTION OF THE DRAWINGS

Embodiments of the invention will now be described with reference to the accompanying drawings.

DETAILED DESCRIPTION OF THE INVENTION

Figure 1:
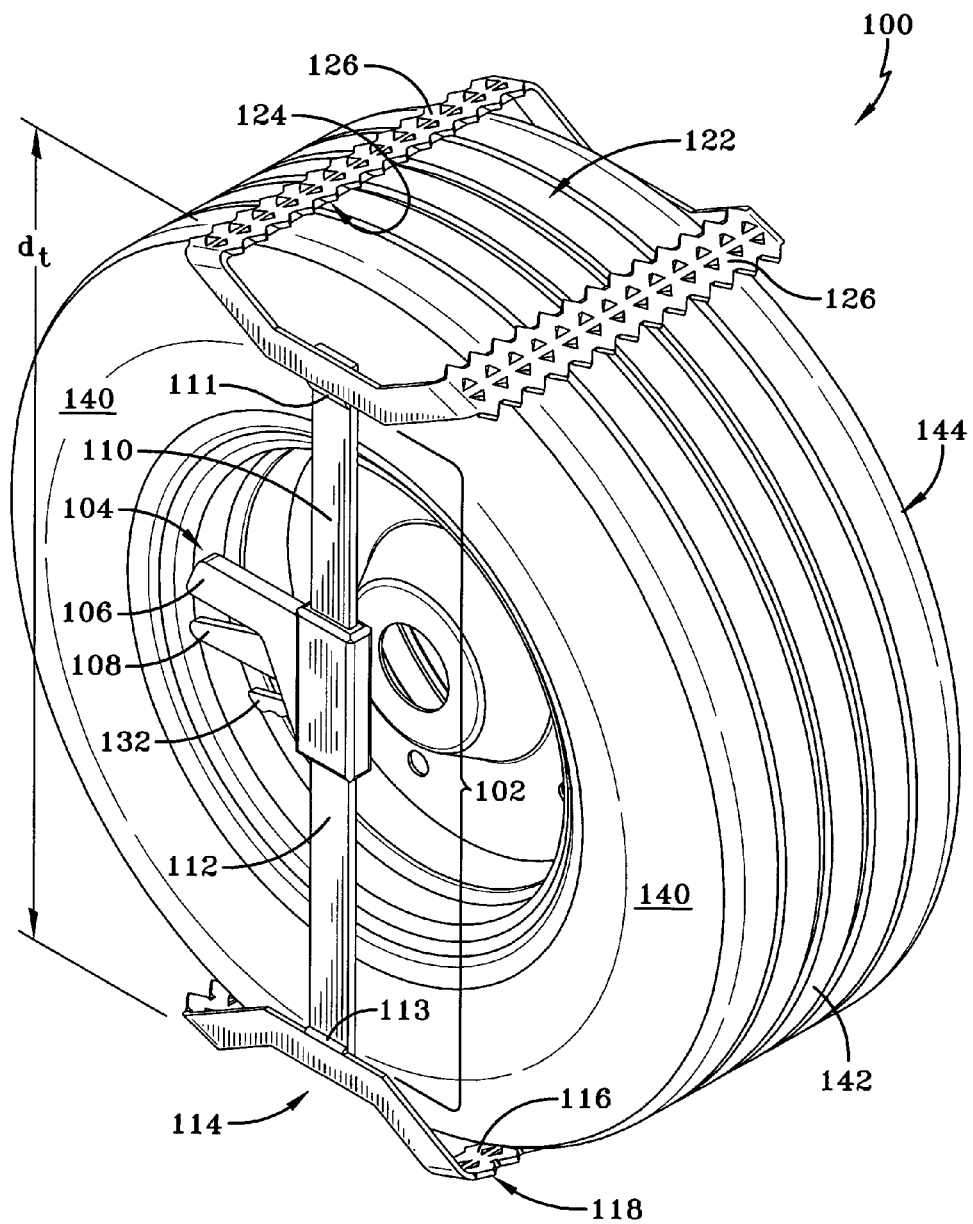
FIG. 1 illustrates an upper side perspective view of a tire friction device as it would mount on a vehicle tire according to an embodiment of the invention.

One or more implementations of the present invention will now be described with reference to the attached drawings, wherein like reference numerals are used to refer to like elements throughout. The invention relates generally to an adjustable device capable of increasing wheel/tire friction by providing additional traction for vehicle tires on a variety of surfaces such as snow, ice, sand, loose gravel and mud that is easy to apply, remove, repair, operate and store. The invention is basically a device or method comprising an adjustable tire friction device having interchangeable friction elements capable of increasing tire tread friction under a variety of road surface conditions that attaches to an outside of a tire. The disclosed tire friction device is designed for rapid and easy application to a wide array of vehicle tires when the vehicle becomes stuck on a road or other surface such as snow, ice, mud, sand, and the like. A user engages the device by utilizing the friction elements of choice for the specific type of ground surface on the tire treads and operating the adjusting mechanism with one and/or two hands so that the device becomes firmly mounted to the tire.

Referring now to the drawings, one embodiment of the invention is illustrated in FIG. 1 which shows a tire friction device 100 in conjunction with a vehicle tire 144 having a tire inner sidewall (not shown), a tire outer sidewall 140, and a tire/tire tread surface 142. The tire 144 may be any conventional vehicle tire or wheel associated with any vehicle comprising an automobile tire, a truck tire, a trailer tire, an ATV tire, a riding lawn mower tire, tractor, and the like, that can become trapped or stuck on a slippery or uneven road surface, for example. The friction device 100 comprises a sub-frame assembly 102 capable of being positioned and mounted near the outer sidewall 140 of the tire 144.

When mounting the device 100 to the tire 144, a fixed end component 110 and an adjustable end component 112 are positioned so that the length between first and second distal ends 111 and 113 respectfully, is greater than that of a tire diameter ($d_t$). The length adjustment is done utilizing a length adjusting mechanism 104, which in this embodiment comprises a hand grip 106, a trigger 108 and a length fixing/releasing mechanism 132. As the hand grip 106 and trigger 108 are squeezed, the adjustable end component 112 is pushed or pulled along the fixed end component 110 until a desired length is achieved. When the hand grip 106 is released the adjustable end component 112 locks non-fixedly the desired length of the sub-frame assembly 102 or the optional length fixing/releasing mechanism 132 can be applied to lock and maintain the desired length of the sub-frame assembly 102 in position on the tire 144.

Although the end components 110 and 112 are rectangular in cross section they can also comprise cross-sectional shapes such as I-beams, geometric shapes, circular bar stock, a combination thereof, and the like. The length adjusting mechanism 104 can comprise a friction device, a compression device, a ratchet device, a gear system, teeth components, pins, a hand grip winch, a cam system, a pulley, electrical tightening devices, a trigger hand clamp, a ratchet pulley assembly, a battery operated electric winch, a pistol-style clamp, a pinch plate device, ratchet strap assemblies, a braided cable come along, or other mechanisms known by one of skill in the art, capable of holding the device 100 rigidly at the desired length as well as releasing the device 100. These embodiments also comprise a first grip member 114 for gripping the tire/tire tread surface 142 (not including the tire rim) and a second grip member 122 for gripping the tire/tire tread surface 142 to increase the available traction surface area for the device 100. The scope of the invention does not limit the shape or design of the first and second grip members 114 and 122, respectively. The invention also contemplates first grip and second grip members that are solid, stamped mechanisms, u-shaped components, have a plurality of finger elements, or any other configuration that one skilled in the art would use to facilitate gripping. In addition, the invention embraces a design where the first and the second grip members 114 and 122 are not identically shaped or have different configurations.

The end components 110 and 112 may be constructed of steel bar stock, stainless steel, aluminum, plastic, nano-fibers, metal, and the like, or of any other rigid or non-rigid material known by one of skill in the art that is capable of resisting the forces that may occur during tire rotation or movement to dislodge the device 100.

The gripping members 114, 122 include both inner gripping surfaces 116, 124 for making contact with and gripping the tire/tire tread surface 142, and outer friction surfaces 118, 126 for making contact with and increasing friction on the road or terrain surface, for example. One piece gripping members can be formed or manufactured using techniques comprising taking flat metal sheet stock and stamping out a grip member, grip teeth, gripping points and bending the flat metal sheet into a given shape and other techniques know by those of skill in the art. Grip member materials comprise stainless steel, plastic, carbon steel, galvanized steel, high strength plastics, aluminum, wrought iron, fiber-reinforced synthetic material, nano-fibers, elastomeric materials, and spring steel.

The outer friction surfaces 118, 126 may be comprised of the same material as the inner gripping surfaces 116, 124 with the same surface configuration, or the inner and outer surfaces may be comprised of the same materials, but have a different surface design comprising teeth, grooves, knobs, points, raised diamond plate patterns, and the like, built directly into the friction surface and/or member. Alternatively the outer friction surfaces 118, 126 may be comprised of different material than the inner gripping surfaces 116, 124 with the same or different surface configuration.

The friction elements and/or surfaces comprise wire fabric, chain, pointed tabs, brackets, screws, bolts, or any other known fastening mechanism known by one of skill in the art. The invention includes devices where various friction elements are permanently attached to the device 100 such as by welding, in addition to friction surface elements that are detachable and interchangeable to deal with a multitude of surface conditions. The embodiment in FIG. 1 shows stamped friction elements, for example.

Figure 2:
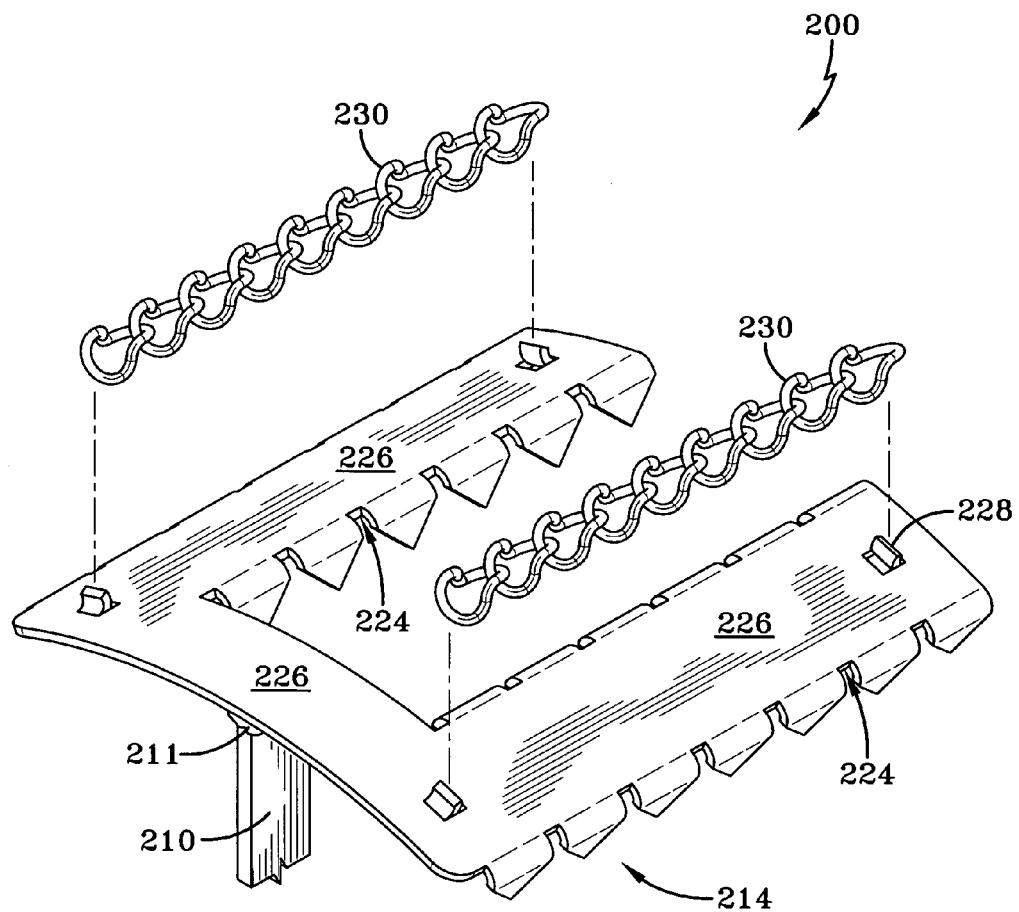
FIG. 2 illustrates a top perspective view of a grip member with a mounted chain component on a grip member according to another embodiment of the invention.

FIG. 2 illustrates another embodiment of a grip member 200 that has an attachable friction element 230, for example, in this embodiment a chain 230 is attached to an outer friction surface 226 where connection devices can be bolts with washers (not shown), for example. This embodiment also demonstrates how the grip member 200 can be MIG welded to an end component 210, for example. Although the grip member 200 is shown as welded to the end component 210, one skilled in the art can utilized different techniques for attaching the grip member 200 comprising a hinge member; quick release devices, bolts, nuts and washers, and the like.

Mechanical folding and locking mechanisms are well known by those of skill in the art. For example, the hinge mechanisms can comprise a hinge, a spring assembly, a pivot device, an axle, and the like. When in the storage position, the grip members for example can lock into place against and/or parallel to the sub-frame assembly. As stated supra, when in use, grip members can lock into position at substantially a ninety degree angle to the arm members so that an inner gripping surface 214, for example, is capable of resting transversely to the tire sidewall and across a tire tread. When the device is removed from the tire, the process is reversed so that the grip member 200, for example can be unlocked from the ninety degree position. The device can then be removed from the tire, and a grip member, for example can be locked into place against or parallel to the sub-frame assembly for easy and compact storage. The locking mechanism (not shown) for the hinge positions comprise a locking pin and detent, a latch, a clip, and the like, or any other mechanism for fixing a locked position known by those of skill in the art.

The outer friction surface 226 may be comprised of the same material as the inner gripping surface 224 with the same surface configuration, or they may be comprised of the same material, but have a different surface design such as teeth, grooves, knobs, points, a raised diamond plate patterns, and the like. The inner gripping surface 224 is for making contact with a tire tread. The outer friction surface 226 is for making contact with the road or terrain surface. The outer friction surface 226 may be comprised of the same material as the inner gripping surface 224 with the same surface configuration, or they may be comprised of the same material, but have a different surface design such as teeth, grooves, knobs, points, a raised diamond plate patterns, and the like. Alternatively the outer friction surface 226 may be comprised of different material than the inner gripping surface 224 with the same or different surface configurations.

The embodiment in FIG. 2 illustrates the outer friction surface 226 where there are connection members 228 for connecting additional friction attachments. The connection members 128 may also be constructed with materials comprising wire, tabs, brackets, screws, bolts, or any other known fastening mechanism by one of skill in the art. The connection members 128 comprise clips, clamps, tabs and the like. The invention includes devices where various friction elements that are permanently attached to the device comprising welding, brazing, fasteners, etc. In addition to friction surface elements that are detachable and interchangeable to deal with a multitude of surface conditions. The embodiment in FIG. 2 shows a friction element 230 comprising metal chain link.

Figure 3:
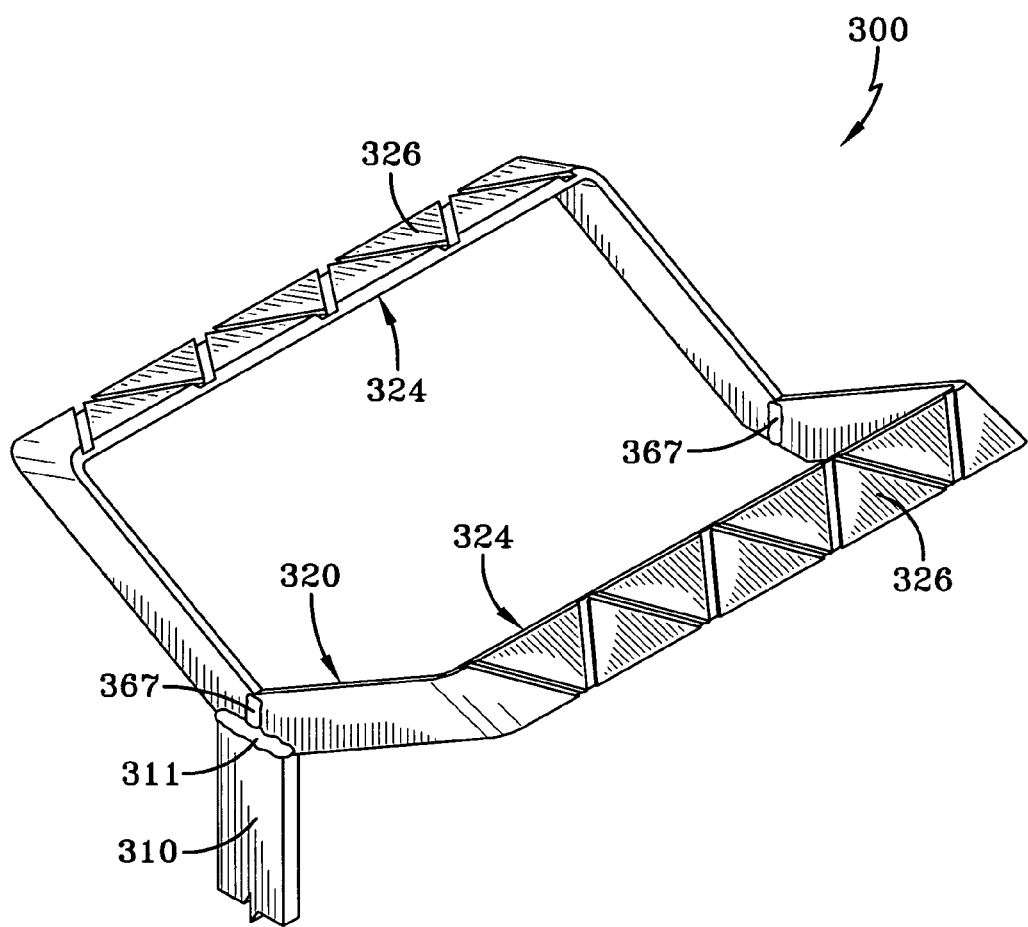
FIG. 3 illustrates a top perspective view of a stamped and welded grip member yet according to another embodiment of the invention.

FIG. 3 illustrates yet another embodiment of a grip member 300 that has a stamped outer friction surface 326 shaped in a triangular friction pattern, for example, and can be a welded assembly with welds illustrated at 367. The triangular friction pattern can be formed using techniques comprising stamping, machining, laser cutting and other approaches well known by those of skill in the art. This embodiment also demonstrates how the grip member 300 is welded to an end component 310, for example.

The outer friction surface 326 may be comprised of the same material as an inner gripping surface 324 with the same surface configuration, or they may be comprised of the same material, but have a different surface design such as teeth, grooves, knobs, points, a raised diamond plate patterns, and the like. The inner gripping surface 224 makes contact with a tire tread. The outer friction surface 326 is for making contact with the road or terrain surface. The outer friction surface 326 may be comprised of the same material as the inner gripping surface 324 with the same surface configuration, or they may be comprised of the same material, but have a different surface design such as teeth, grooves, knobs, points, a raised diamond plate patterns, and the like. Alternatively the outer friction surface 326 may be comprised of different material than the inner gripping surface 324 with the same or different surface configurations.

Although the grip member 300 is shown as welded to the end component 310, one skilled in the art can utilized different techniques for attaching a grip member to an end component comprising hinge members, an elastomeric device, a strapping device, motors, and the like. In addition, there are other rotational devices known by those of skill in the art. In addition, a grip member can be non-fixedly attached to an end component so that various grips can be interchanged based upon the ground conditions. The grip member 300 illustrated in FIG. 3 can have additional mechanisms for holding the grip member front sidewall surface against a front tire sidewall and/or a back tire sidewall in place. The additional mechanisms comprise threaded wing-nuts, steel bolts with plastic hand knobs, mechanisms to apply pressure to a tire sidewall, clamping devices and other mechanisms/devices for non-fixedly attaching a grip member to a tire known by those of skill in the art.

Figure 4:
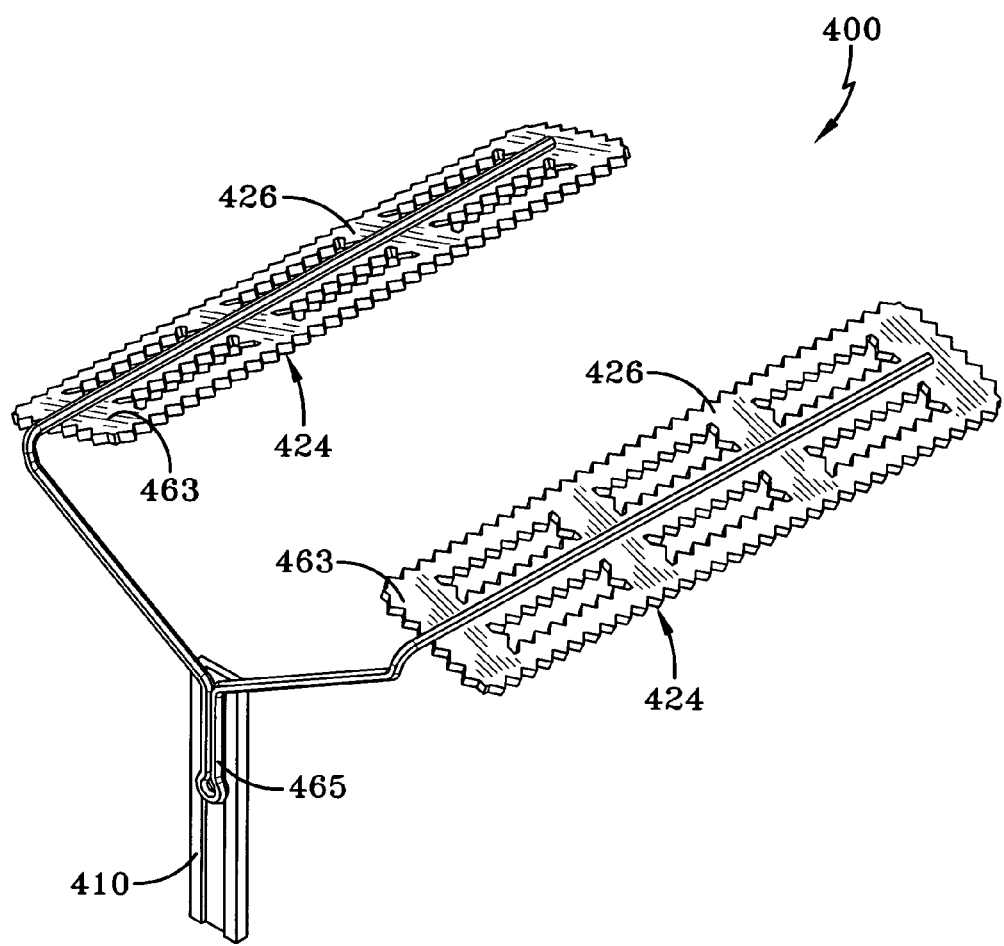
FIG. 4 illustrates a top perspective view of a welded grip member according to another embodiment of the invention.

Another embodiment of a grip member 400 is illustrated in FIG. 4. The scope of the invention does not limit the shape or design of a grip member that are well known by those of skill in the art. The invention also contemplates grip members that are welded, hollow, solid, u-shaped, cylindrical, wire forms, fencing material, or any other configuration that one skilled in the art would use to facilitate traction. In addition, the invention embraces a design where grip members on each end of the device that are not identically shaped, but each has a different shape and configuration.

In this embodiment of the grip member 400, bent and formed bar stock 465 is welded to an I-beam linear bar stock adjustable end component 410. Pre-formed stair grating 463 can be welded to the formed bar stock 465 to form the grip member 400.

Figure 5:
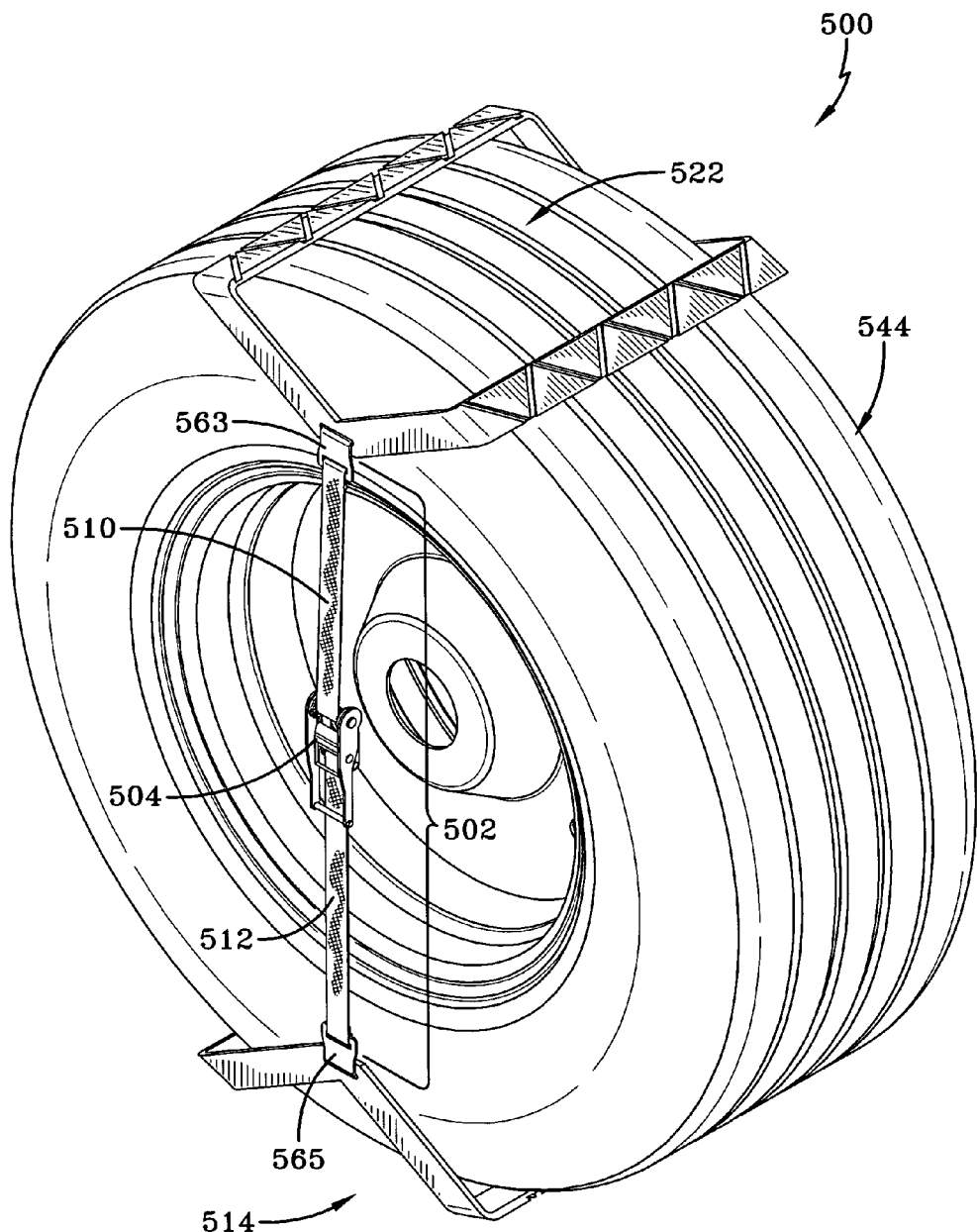
FIG. 5 illustrates a top perspective view of a tire friction device as it would mount on a vehicle tire with straps according to an embodiment of the invention.

Another embodiment of a tire friction device 500 of the present invention may be adjusted to a desired length as shown in FIG. 5 and mounted on a tire 544. The tire friction device 500 comprises a sub-frame assembly 502 comprising a first strap 510 and a second strap 512 that are configured to be tensioned/locked in place utilizing a hand winch length adjusting mechanism 504. However, the length adjusting mechanism 504 can, for example, can adjust the length using a device comprising a turnbuckle, a clamp, an adjustment cable as strap members, or any other length adjusting device known by one of skill in the art.

The first and second straps 510 and 512 can be attached to a first grip member 514 and a second grip member 522 utilizing a first clip 563 and a second clip 565.

In addition, although not illustrated the inventor envisions a tire friction device that comprises a single stand-alone grip member (not shown) that attaches to a tire and grips the tire outer sidewall, the tire inner sidewall and the tire tread. The single stand-alone grip member would attach to the tire with mechanisms comprising a c-clamp type mechanism, clamps, a cam locking device and other devices known by those of skill in the art.

Figure 6:
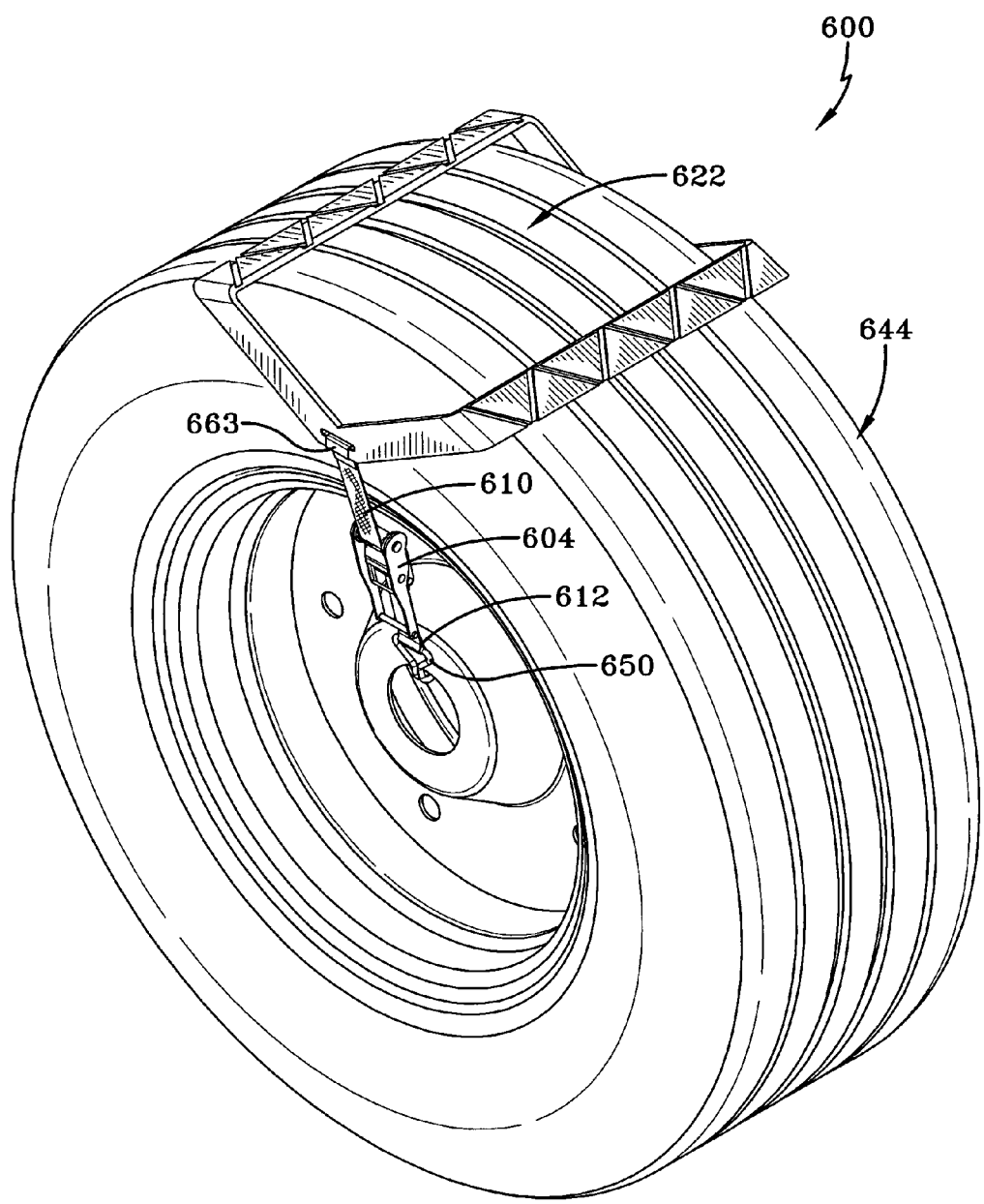
FIG. 6 illustrates a top perspective view of a tire friction device with a strapped tire grip member and a tire rim center opening hook/grip device, according to yet another embodiment of the invention.

FIG. 6 demonstrates yet another embodiment of the present invention, a tire friction device 600. The tire friction device 600 includes a grip member 622 that can be attached to an adjustable strap member 610 with a hook mechanism 650 for non-fixedly attaching the grip member 622 to a tire 644. The tire friction device 600 is configured to be tensioned/locked in place utilizing a hand winch length adjusting mechanism 504. Although the mechanism 650 is illustrated as a hook one skilled in the art can utilize other attachment mechanisms comprising clamps, clips and other retention release mechanisms.

Figure 7:
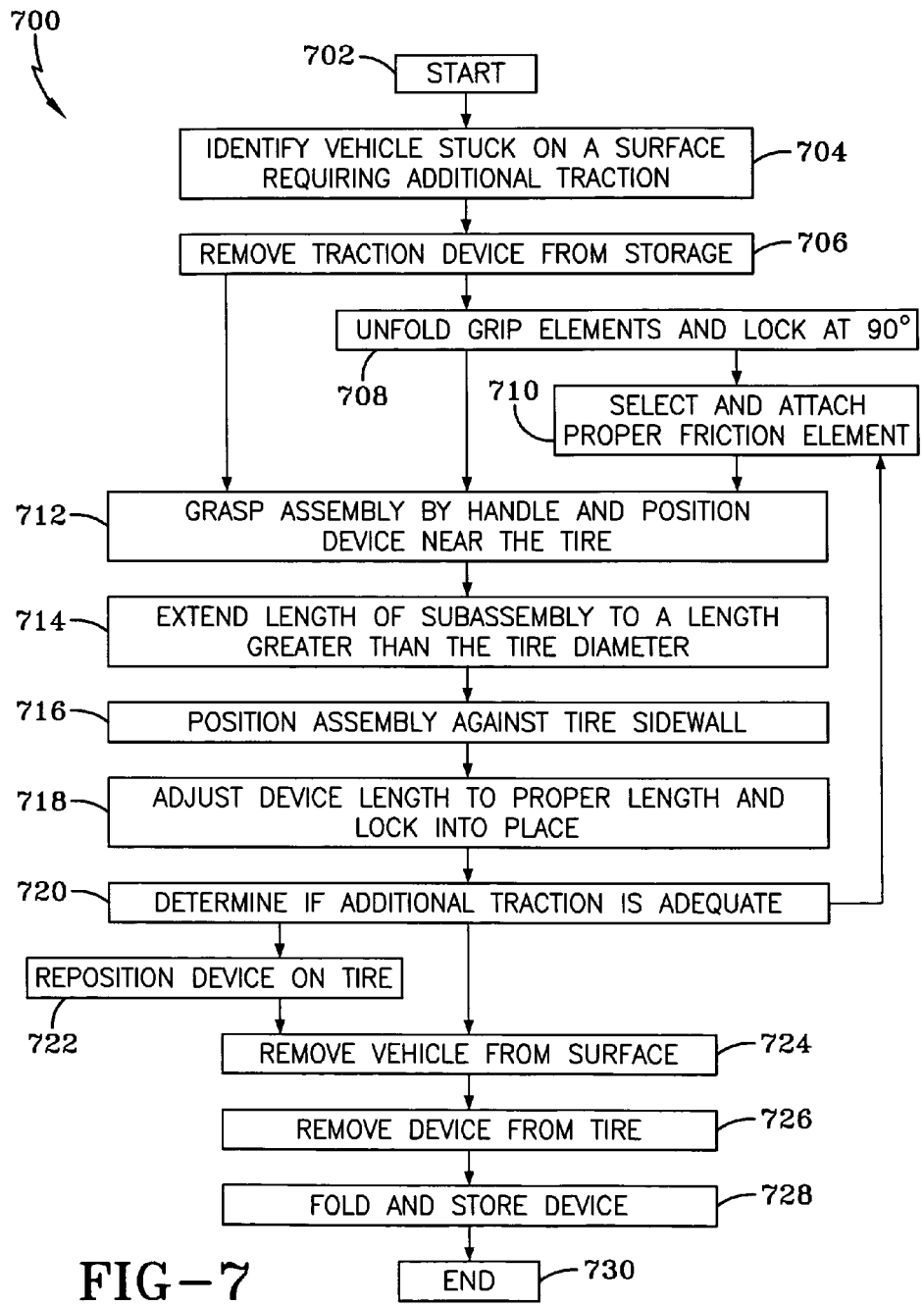
FIG. 7 illustrates a functional block diagram of a method of using a traction device for increasing tire gripping friction according to another embodiment of the invention.

Illustrated in FIG. 7, according to one or more aspects of the present invention, is an exemplary method 700 of increasing tire friction which will be described with respect to other figures for employing a tire friction device 100 to a vehicle tire 144 to assist a vehicle in moving off of a soft or slippery surface such as sand, loose gravel, snow, ice, mud, or the like. The method 700 will be described with respect to FIG. 1. Referring now to FIG. 1, the device 100 may be advantageously employed in association with an automobile tire 144, however, this method is not limited to automobile tires but applies to tires for tractors, trailers, carts, ATV's, riding lawn mowers, and any other wheeled vehicles or apparatus. The method 700 begins at 702, wherein at 704, the automobile is determined to be stuck on a surface where there in not enough tire traction to drive it off of the surface due to ground conditions. Once the vehicle is determined to be stuck, at 704, the tire friction device 100 is removed from storage at 706, such as in the trunk of the vehicle, or borrowed from someone, etc. If the device 100 has fixedly attached hinged gripping members (not shown), at 708 the grip members 114 and 122 can be unlocked from the storage position up against the sub-frame assembly 102, and locked into position at approximately ninety degrees to the sub-frame assembly 102.

If the grip members 114 and 122 have interchangeable friction elements the method 700 then proceeds to 710, where the user may select, for example, the friction element 230 (FIG. 2) best able to provide enough friction to remove the vehicle from the stuck condition. Once selected, the chosen friction element 230 is attached to the grip member 200 at the connection members 228. If the grip elements are fixedly attached to the end components 110, 112, in other words they are welded or otherwise nonadjustable, or if the friction elements are not interchangeable, the method proceeds to 712.

At 712 the device 100 is grasped by the length adjusting mechanism 104 at the hand grip 106 with two hand (optionally one hand), and is placed near or against the outer sidewall 140 of the tire 144. Next at 714, the sub-frame assembly 102 is extended for example by activating the length fixing/releasing mechanism 132 until a length between first and second distal ends 111 and 113 is greater than the tire's outer diameter, $d_t$. The device 100 is then placed against the outer sidewall 140 at 716 and at 718; the sub-frame assembly 102 is readjusted so that the grip members 114, 122 rest firmly and transversely against the tire/tire tread surface 142. In other words, the adjusting mechanism 104 is tightened so that the device 100 is held in place on the tire 144 by the inner gripper surface 116, 124. The length is then locked in place optionally with the length fixing/releasing mechanism 132.

Once the device 100 is employed on the tire 144, at 720, the user determines if there is enough traction to remove the vehicle from the surface. If the vehicle is unable to be removed from the surface, at 722 the device 100 may be repositioned on the tire or an additional devices (not shown) can be installed. Another attempt is then made to remove the vehicle. If there is not enough traction and the device has interchangeable friction elements, the method repeats at 808 and new friction elements (not shown) are employed that are capable of removing the vehicle from the surface. If there is enough traction, at 724, the vehicle is driven off of the slippery surface. Once the vehicle is back on less slippery ground, for example, the device 100 is removed at 726 by reversing the application process described supra. At 728, if the device 100 has foldable grip members, they are returned to the nonuse position and the device 100 is returned to storage, for example, placed in a carrying bag and stored in the trunk. The method 700 then ends at 730.

Although the invention has been illustrated and described with respect to one or more embodiments, implementations, alterations, and/or modifications may be made to the illustrated examples without departing from the spirit and scope of the appended claims. In particular regard to the various functions performed by the above described components or structures (assemblies, devices, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including," "includes," "having," "has," "with," or variants thereof are used in either the detailed description and the claims, such terms are intended to be inclusive in a manner similar to the term "comprising".

What is claimed is:

1. A tire friction device, comprising:
   a sub-frame assembly comprising a rigid length adjustment assembly with a fixed end component and an adjustable end component, a first grip member and a second grip member; and
   wherein the first grip member is fixedly attached to the distal end of the fixed end component and the second grip member is fixedly attached to the distal end of the adjustable end component;
   wherein said grip members engage a tire having a tread surface and inner and an outer sidewalls;
   wherein said fixed end and adjustment end components are joined such that they are adjustable for length;
   wherein said adjustment assembly locks said adjustable end component to said fixed end component to maintain said sub-frame assembly at a desired length;
   whereby when in use, the length adjustment assembly in a tire gripping position is approximately parallel to a tire's rotational plane;
   whereby when in use, the first grip member and the second grip member are approximately perpendicular to a tire's rotational plane in the tire gripping position;
   whereby when in use, the adjusting mechanism is adjusted to non-fixedly clamp the tire in the tire gripping position or release the tire friction device from the tire;
   whereby when in use, the length adjustment assembly is located proximate to the tire outer sidewall when non-fixedly clamping the tire in the tire gripping position, and
   wherein said grip members increase traction between the tire and a driving surface.

2. The tire friction device of claim 1, wherein the first grip member and the second grip member contact the tire tread; or the tire outer sidewall and the tire tread; or the tire inner sidewall and the tire tread; or the tire inner and outer sidewall and the tire tread.

3. The tire friction device of claim 1, wherein the tire comprises a conventional vehicle tire, an automobile tire, a truck tire, a trailer tire, an ATV tire, a riding lawn mower tire and a tractor tire.

4. The tire friction device of claim 1, further comprising two or more grip members.

5. The tire friction device of claim 1, wherein the adjusting mechanism comprises a hand grip winch, a gear system, a pulley, electrical tightening devices, a ratchet pulley assembly, a battery operated electric winch, a trigger hand clamp, a pinch plate, a pistol-style clamp, ratchet strap assemblies, and a come along.

6. The tire friction device of claim 1, wherein the first grip and the second grip are non-fixedly attached to the tire at two locations on the tire tread approximately one hundred and eighty degrees apart.

7. The tire friction device of claim 1, wherein various grips are interchangeable based on the ground surfaces comprising snow, ice, sand, mud, gravel and ruts.

8. The tire friction device of claim 1, wherein the length adjustment assembly, the first grip member and the second grip member have components comprising hinges, threaded rod, a cam and handle, and quick release/connect components.

9. A tire friction device comprising:
   a length adjustment assembly comprising a fixed end component and an adjustable end component; and
   wherein the fixed end component further comprises a tire grip member for gripping a tire tread and a tire center rim opening attachment component;
   wherein an adjustable end component further comprises a tire rim center opening attachment component for gripping the tire rim center opening;
   wherein the adjusting mechanism is adjusted to non-fixedly clamp or release the tire grip member and the second grip member from the tire;
   wherein the length adjusting mechanism is located at or near the tire outer sidewall when non-fixedly clamping the tire;
   wherein end components comprise fabric straps, plastic straps, woven straps, I-beams, angle iron, bar stock, threaded rod, straps, chains, wire, braided wire and elastomeric bands; and
   wherein the end components are made of materials comprising stainless steel, plastic, carbon steel, galvanized steel, high strength plastics, aluminum, wrought iron, fiber-reinforced synthetic material, nano-materials, elastomeric materials, and spring steel.

10. The tire friction device of claim 9, wherein a first and a second grip members are interchangeable with different style grips that provide greater friction based on surface conditions comprising, snow, ice, mud, gravel and sand.

11. The tire friction device of claim 9, wherein the tire friction device comprises different style grip members.

12. The tire friction device of claim 9, wherein the tire grip member comprising ductile iron step irons, grate tread, serrated step, fencing, chain, stampings, elastomeric bands, friction band, wire or a combination thereof; and
   wherein the tire grip member materials comprise stainless steel, plastic, carbon steel, galvanized steel, high strength plastics, aluminum, wrought iron, fiber-reinforced synthetic material, nano-materials, elastomeric materials, and spring steel;
   wherein the tire rim center opening attachment component materials comprise stainless steel, plastic, carbon steel, galvanized steel, high strength plastics, aluminum, wrought iron, fiber-reinforced synthetic material, nano-materials, elastomeric materials, and spring steel.

13. A method of increasing tire friction, the method comprising:
- (a) providing a traction device with an adjustment mechanism and first and the second grip members;
- (b) grasping the device by a handle of the adjusting mechanism;
- (c) placing the device, using one hand, near or against an outer sidewall of a tire;
- (d) extending the length between the first and the second grip member by activating a length fixing/releasing mechanism and pulling the first and the second grip member further apart until the length between the first and the second grip member is greater than the tire's outside diameter;
- (e) grasping the device with one hand and placing the device against an outer sidewall of the tire;
- (f) readjusting the sub-frame assembly so that the first and second grip members grip firmly and transversely against the tire/tire tread;
- (g) locking the device in place with the length fixing/releasing mechanism;
- (h) determining if there is enough traction to move the vehicle successfully.

14. The method of increasing tire friction of claim 13, wherein step (g) further comprises
- repositioning the sub-frame assembly to further tighten the device to the tire,
- locking the device in place with the length fixing/releasing mechanism.

* * * * *